United States Patent
Kondo et al.

(10) Patent No.: US 9,116,316 B2
(45) Date of Patent: Aug. 25, 2015

(54) OPTICAL CONNECTOR, MALE CONNECTOR HOUSING FOR OPTICAL CONNECTOR, AND FEMALE CONNECTOR HOUSING FOR OPTICAL CONNECTOR

(71) Applicants: FURUKAWA ELECTRIC CO., LTD., Tokyo (JP); FURUKAWA AUTOMOTIVE SYSTEMS INC., Shiga (JP)

(72) Inventors: Toshikuni Kondo, Shiga (JP); Noritsugu Enomoto, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 14/502,484

(22) Filed: Sep. 30, 2014

(65) Prior Publication Data

US 2015/0016785 A1    Jan. 15, 2015

Related U.S. Application Data

(63) Continuation of application No. PCT/JP2013/058612, filed on Mar. 25, 2013.

(30) Foreign Application Priority Data

Mar. 30, 2012   (JP) .................. 2012-078779

(51) Int. Cl.
  *G02B 6/40*   (2006.01)
  *G02B 6/42*   (2006.01)
  *G02B 6/38*   (2006.01)

(52) U.S. Cl.
  CPC .............. *G02B 6/4256* (2013.01); *G02B 6/423* (2013.01); *G02B 6/426* (2013.01); *G02B 6/4292* (2013.01); *G02B 6/389* (2013.01)

(58) Field of Classification Search
  CPC ...... G02B 6/426; G02B 6/389; G02B 6/4256; G02B 6/423; G02B 6/4292
  USPC ........................................................ 385/92, 93
  See application file for complete search history.

(56) References Cited

U.S. PATENT DOCUMENTS 4,918,513 A * 4/1990 Kurose et al. ................... 439/73
5,663,833 A * 9/1997 Nanba et al. .................. 359/631

(Continued)

FOREIGN PATENT DOCUMENTS

JP    H10-142451 A    5/1998
JP    H10-241790 A    9/1998

(Continued)

OTHER PUBLICATIONS

International Search Report for PCT/JP2013/058612, mailed May 21, 2013 (2 pages).

*Primary Examiner* — Akm Enayet Ullah
(74) *Attorney, Agent, or Firm* — Osha Liang LLP

(57) ABSTRACT

Guiding convexed and concaved parts provided on inner side surfaces of a female connector housing have inclining surfaces inclining with respect to a direction perpendicular to the inner side surfaces; whereas guided convexed and concaved parts provided on outer side surfaces of a male connector housing have inclining surfaces facing the inclining surfaces of the guiding convexed and concaved parts.

12 Claims, 15 Drawing Sheets

(56) References Cited

U.S. PATENT DOCUMENTS

| | | | |
|---|---|---|---|
| 5,787,215 A * | 7/1998 | Kuhara et al. | 385/88 |
| 6,079,881 A * | 6/2000 | Roth | 385/76 |
| 6,764,222 B1 * | 7/2004 | Szilagyi et al. | 385/55 |
| 8,814,441 B2 * | 8/2014 | Strasser et al. | 385/56 |
| 2010/0290740 A1 * | 11/2010 | Ohtsuka et al. | 385/60 |
| 2012/0230011 A1 * | 9/2012 | Harada | 362/84 |
| 2012/0263416 A1 * | 10/2012 | Morioka | 385/33 |
| 2014/0348472 A1 * | 11/2014 | Kondo et al. | 385/89 |

FOREIGN PATENT DOCUMENTS

| | | |
|---|---|---|
| JP | 2004-350718 A | 12/2004 |
| JP | 2008-166046 A | 7/2008 |
| JP | 2011-028851 A | 2/2011 |

\* cited by examiner

FIG. 1
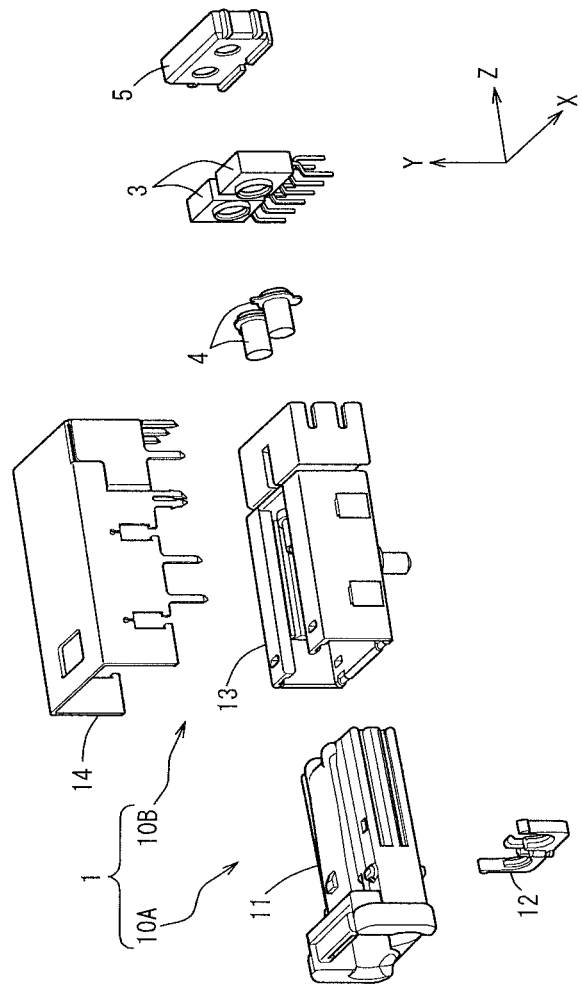
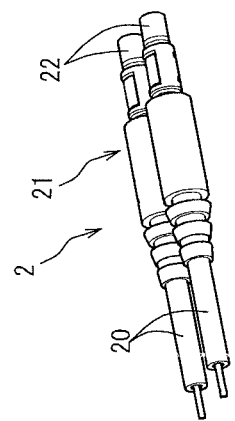

OPTICAL CONNECTOR, MALE CONNECTOR HOUSING FOR OPTICAL CONNECTOR, AND FEMALE CONNECTOR HOUSING FOR OPTICAL CONNECTOR

TECHNICAL FIELD

The present invention relates to an optical connector for an optical fiber cable forming an optical transmission path usable for transmitting information signals such as control signals, image signals, audio signals and the like, a male connector housing for the optical connector, and a female connector housing for the optical connector.

BACKGROUND ART

Recently, as the amount of communication information such as control signals, image signals, audio signals and the like transmitted in vehicles is increased, optical fiber cables, for example, are used for transmission paths for transmitting the information signals instead of conventional metal cables.

As an element for connecting terminal-attached optical fiber cables which are related members forming an optical transmission path (optical transmission path-related members) to each other (so-called wire-to-wire connection) or for connecting a terminal-attached optical fiber cable to a known FOT (Fiber Optical Transceiver) or the like which is an optical transmission path-related member, an optical connector including a male connector housing to which the optical transmission path-related members are assembled and a female connector housing for allowing the male connector housing to be inserted thereinto is known.

Patent Document 1 identified below discloses an optical connector having the following structure. Inner side surfaces of the female connector housing, corresponding to side surfaces of the male connector housing in a state where the male connector housing is inserted into the female housing, have rectangular convexed and concaved parts having horizontal surfaces which extend in a direction perpendicular to the inner side surfaces. The rectangular convexed and concaved parts extend in a direction in which the male connector housing is inserted.

In Patent Document 1, the side surfaces of the male connector housing have convexed and concaved parts engageable with the convexed and concaved parts of the female connector housing. Owing to this, the male connector housing can be guided in the direction in which the male connector housing is inserted. Thus, the workability of assembling the optical connector can be improved.

However, in the case where the above-described convexed and concaved parts are actually provided, the following possibility is involved. Unless the convexed and concaved parts of the male connector housing and the convexed and concaved parts of the female connector housing are in contact with each other along a sufficient area size, a sufficient level of supporting rigidity of the male connector housing cannot be provided after the male connector housing is inserted.

In order to avoid this, it is conceivable to set the horizontal surfaces of the concaved parts to be as long as possible, so that the contact parts (contact area size) can be sufficiently large. However, in this case, the female connector housing needs to be long in correspondence with the increase of the length of the horizontal surfaces. This results in a size increase of the optical connector.

CITATION LIST

Patent Literature

Patent Document 1: Japanese Laid-Open Patent Publication No. 2011-28851

SUMMARY OF INVENTION

Technical Problem

The present invention has an object of providing an optical connector, a male connector housing for the optical connector and a female connector housing for the optical connector, by which the workability of connection is improved and a sufficient level of supporting rigidity of the male connector housing is provided to stabilize the engagement state of the male and female connector housings while a size increase of the optical connector is suppressed, so that the engagement positional precision of the male and female connector housings is improved and high quality transmission characteristics are maintained for a long time.

Solution to Problem

The present invention is directed to an optical connector including a male connector housing to which optical transmission path-related members forming an optical transmission path are assembled; and a female connector housing for allowing the male connector housing to be inserted thereinto. At least one of outer side surfaces of the male connector housing has a guided convexed and concaved part extending in a direction in which the male connector housing is inserted; an inner side surface of the female connector housing, corresponding to the at least one of outer side surfaces in a state where the male connector housing is inserted into the female connector housing, has a guiding convexed and concaved part extending in the direction in which the male connector housing is inserted, the guiding convexed and concaved part being engageable with the guided convexed and concaved part to guide the male connector housing in the direction in which the male connector housing is inserted; the guiding convexed and concaved part has an inclining surface inclining with respect to a direction perpendicular to the inner side surface; and the guided convexed and concaved part has a counter inclining surface facing the inclining surface.

The optical transmission path-related members may be, for example, a terminal-attached optical fiber cable, FOTs and the like, which form the optical transmission path.

According to the above-described structure, the workability of connecting the male connector housing and the female connector housing, namely, the workability of assembling the optical connector can be improved owing to the guidance of the guiding convexed and concaved part.

The guiding convexed and concaved part has the inclining surface, whereas the guided convexed and concaved part has the counter inclining surface facing the inclining surface. Owing to this, as compared with the case where a horizontal surface is provided, the contact parts of the inclining surface and the counter inclining surface can be increased. In this case, certain contact parts can be provided without fail even if the length of the convexed part included in the guiding convexed and concaved part in the direction perpendicular to the inner side surface is not made long. Therefore, the supporting rigidity of the male connector housing can be provided with certainty while the optical connector is prevented from being increased in size.

Since the supporting rigidity of the male connector housing is provided with certainty in this manner, the engagement state of the male and female connector housings is stabilized. This improves the engagement positional precision of the male and female connector housings. Therefore, high quality transmission characteristics can be maintained for a long time.

In an embodiment of the present invention, an inclining direction of the inclining surface may be set such that a convexed part included in the guiding convexed and concaved part has a width decreasing as being laterally inward from the inner side surface of the female connector housing; and an inclining direction of the counter inclining surface may be set such that a convexed part included in the guided convexed and concaved part has a width decreasing as being laterally outward from the at least one of outer side surfaces of the male connector housing.

According to the above-described structure, a base part of the convexed part included in the guiding convexed and concaved part (end on the inner side surface side) can be made thickest. In this case, even if, for example, a large load is applied to the convexed part when the male connector housing is inserted, the convexed part is prevented from being deformed owing to the thick base part thereof.

In addition, when a load is applied to the inclining surface of the convexed part, a force component in the direction perpendicular to the inner side surface can be received by the inner side surface. Owing to this, even if, for example, a large load is applied to the inclining surface when the male connector housing is inserted into the female connector housing, the convexed part is suppressed more from being deformed as compared with the case where a large load is applied to a horizontal surface.

A base part of the convexed part included in the guided convexed and concaved part (end on the side surface side) can be made thickest. In this case, even if, for example, a large load is applied to the convexed part when the male connector housing is inserted, the convexed part is prevented from being deformed owing to the thick base part thereof.

In addition, when a load is applied to the counter inclining surface of the convexed part, a force component in the direction perpendicular to the side surface can be received by the side surface as in the case of the convexed part included in the guiding convexed and concaved part. Owing to this, even if, for example, a large load is applied to the counter inclining surface when the male connector housing is inserted into the female connector housing, the convexed part is suppressed more from being deformed as compared with the case where a large load is applied to a horizontal surface.

In an embodiment of the present invention, the female connector housing may have the guiding convexed and concaved part on each of both inner side surfaces thereof facing each other; the male connector housing may have the guided convexed and concaved part on each of both outer side surfaces thereof facing each other; the guiding convexed and concaved parts may be asymmetric; and the guided convexed and concaved parts may be asymmetric.

According to the above-described structure, an appropriate orientation of the male connector housing when the male connector housing is to be inserted into the female connector housing can be easily determined based on the shapes of the guiding convexed and concaved part and the guided convexed and concaved part. Thus, erroneous insertion of the male connector housing is prevented.

Advantageous Effects of Invention

The present invention provides an optical connector, a male connector housing for the optical connector and a female connector housing for the optical connector, by which the workability of connection is improved and a sufficient level of supporting rigidity of the male connector housing is provided to stabilize the engagement state of the male and female connector housings while a size increase of the optical connector is suppressed, so that the engagement positional precision of the male and female connector housings is improved and high quality transmission characteristics are maintained for a long time.

BRIEF DESCRIPTION OF DRAWINGS

FIG. 1 is an exploded isometric view showing how a terminal-attached optical fiber cable and FOTs are connected to each other in an embodiment according to the present invention.

DESCRIPTION OF EMBODIMENTS

An embodiment of the present invention will be described with reference to the drawings.

Figure 2:
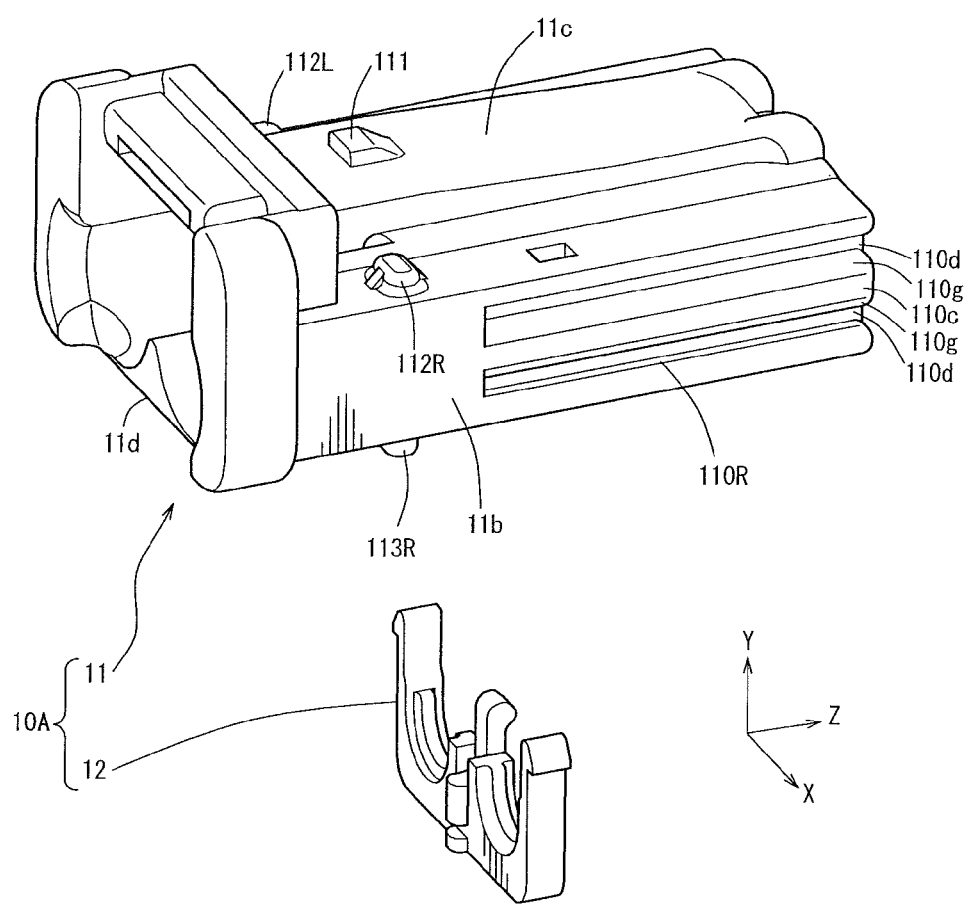
FIG. 2 is an exploded isometric view of a male connector.
Figure 3:
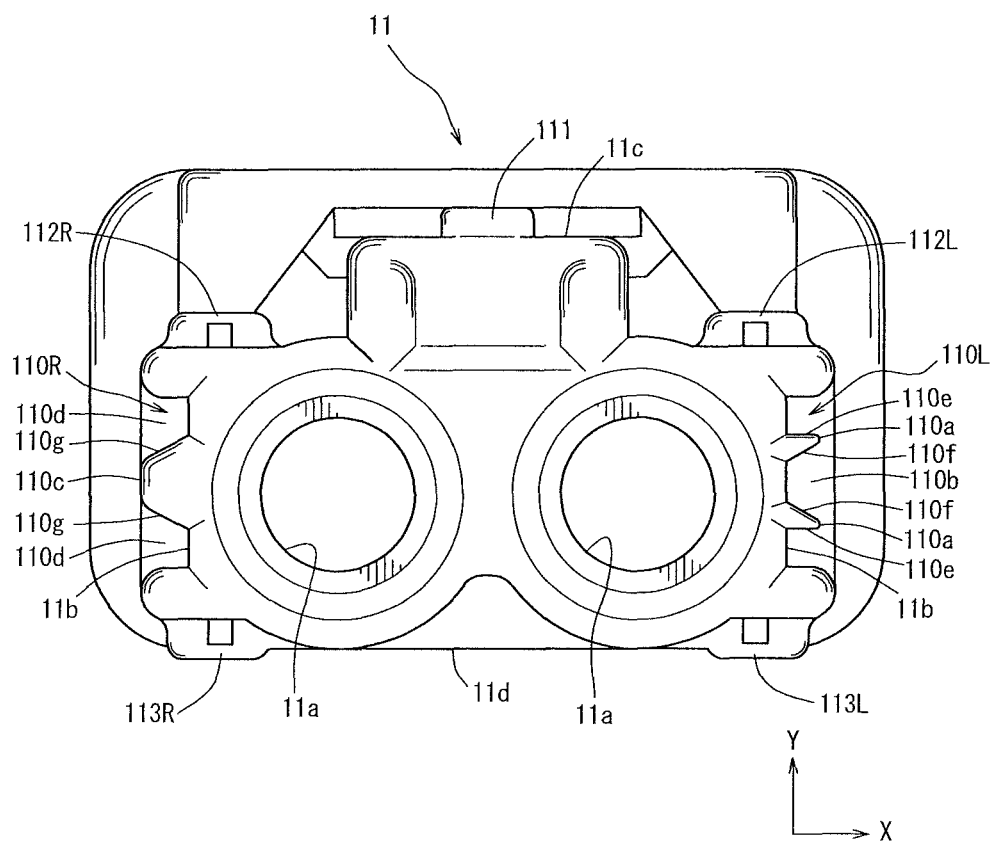
FIG. 3 is a rear view of the male connector as seen from a leading end thereof when the male connector is inserted into a female connector.

FIG. 1 is an exploded isometric view showing how a terminal-attached optical fiber cable 2 and FOTs (Fiber Optical Transceivers) 3 are connected to each other. FIG. 2 is an exploded isometric view of a male connector 10A. FIG. 3 is a rear view of the male connector 10A as seen from a leading end thereof when the male connector 10A is inserted into a female connector 10B.

Figure 4:
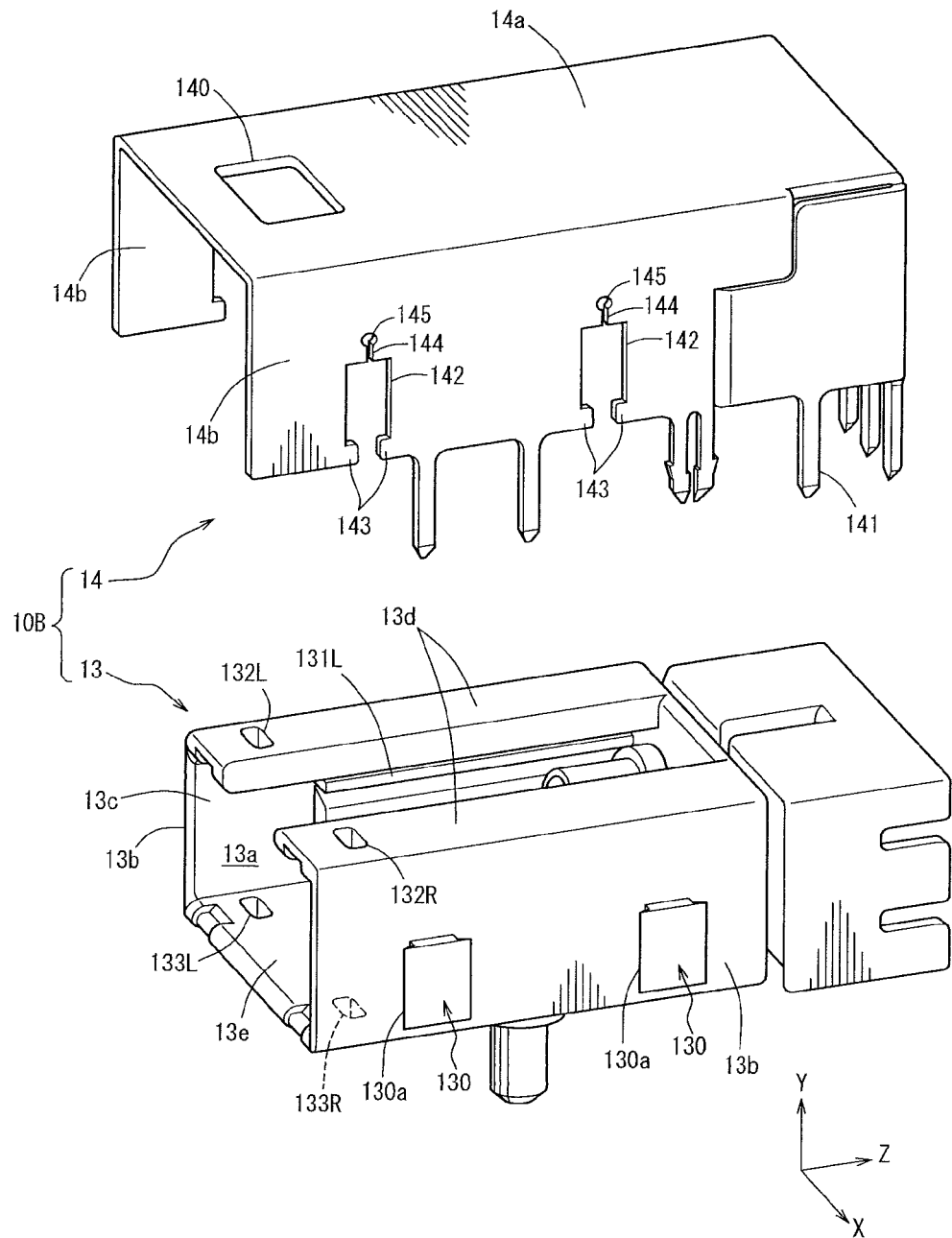
FIG. 4 is an exploded isometric view of the female connector.
Figure 5:
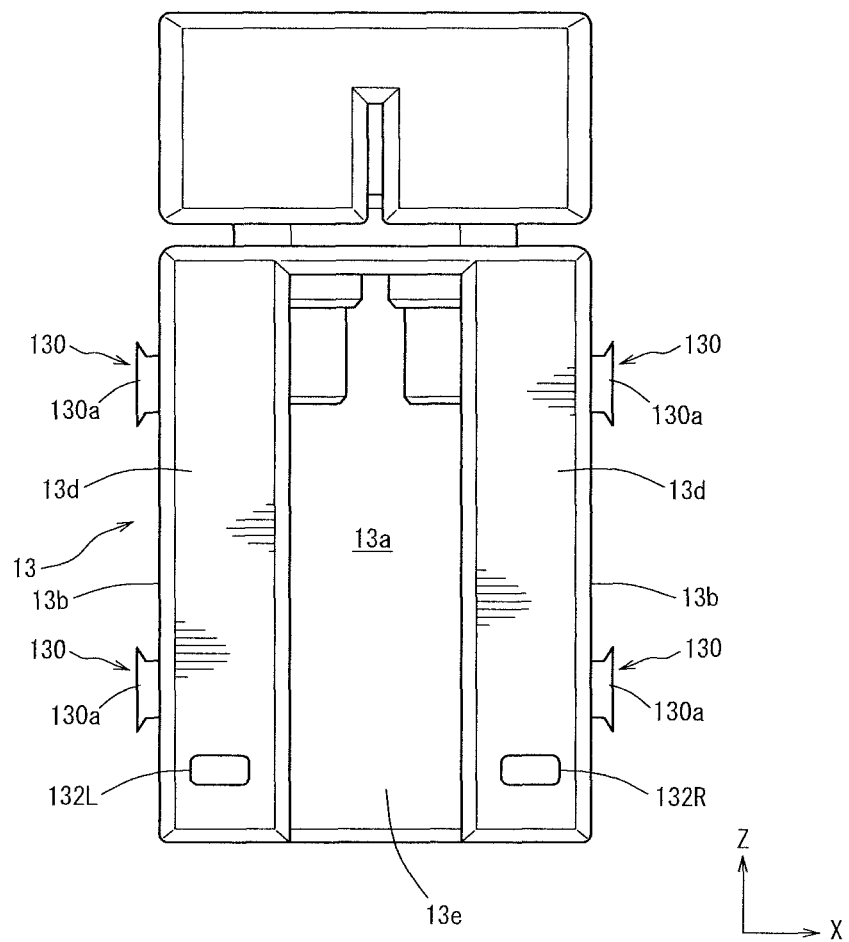
FIG. 5 is a plan view of a female connector housing.
Figure 6:
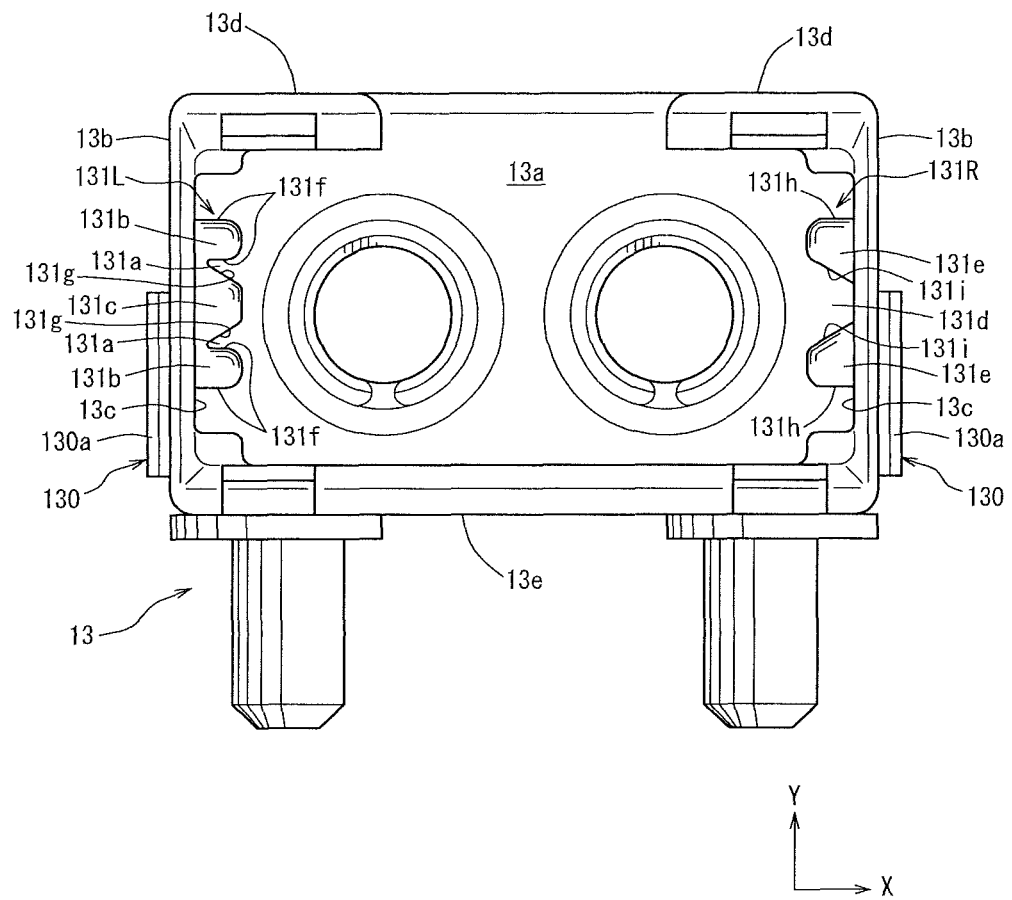
FIG. 6 is a front view of the female connector housing as seen from the side on which a male connector housing is inserted thereinto.

FIG. 4 is an exploded isometric view of the female connector 10B. FIG. 5 is a plan view of a female connector housing 13. FIG. 6 is a front view of the female connector housing 13 as seen from the side on which a male connector housing 11 is inserted thereinto.

Figure 7:
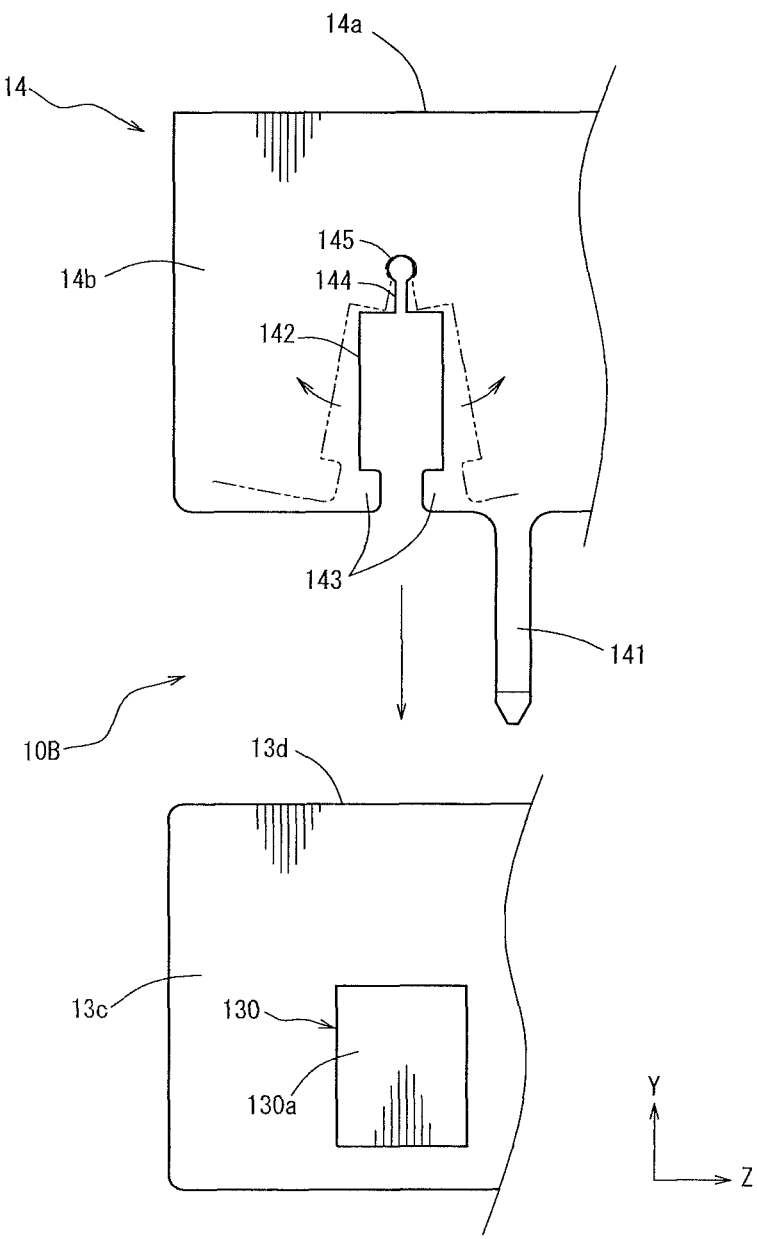
FIG. 7 shows steps of fixing a metal case to the female connector housing.
Figure 8:
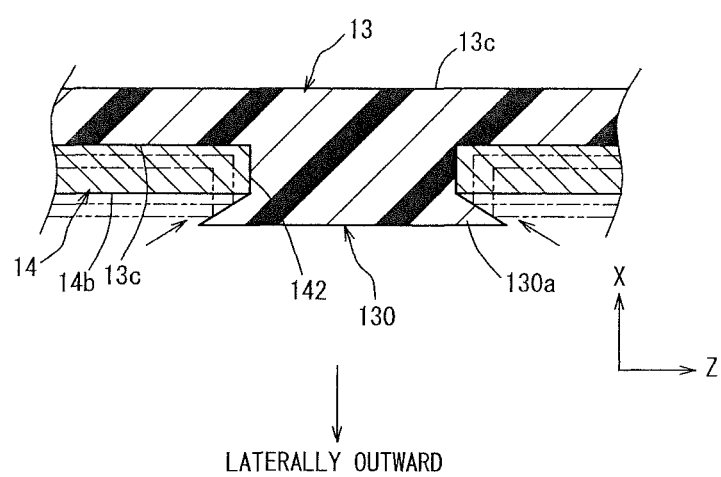
FIG. 8 is a cross-sectional view showing a state where an engageable concaved part of the metal case and an engageable convexed part of the female connector housing are in engagement with each other.
Figure 9:
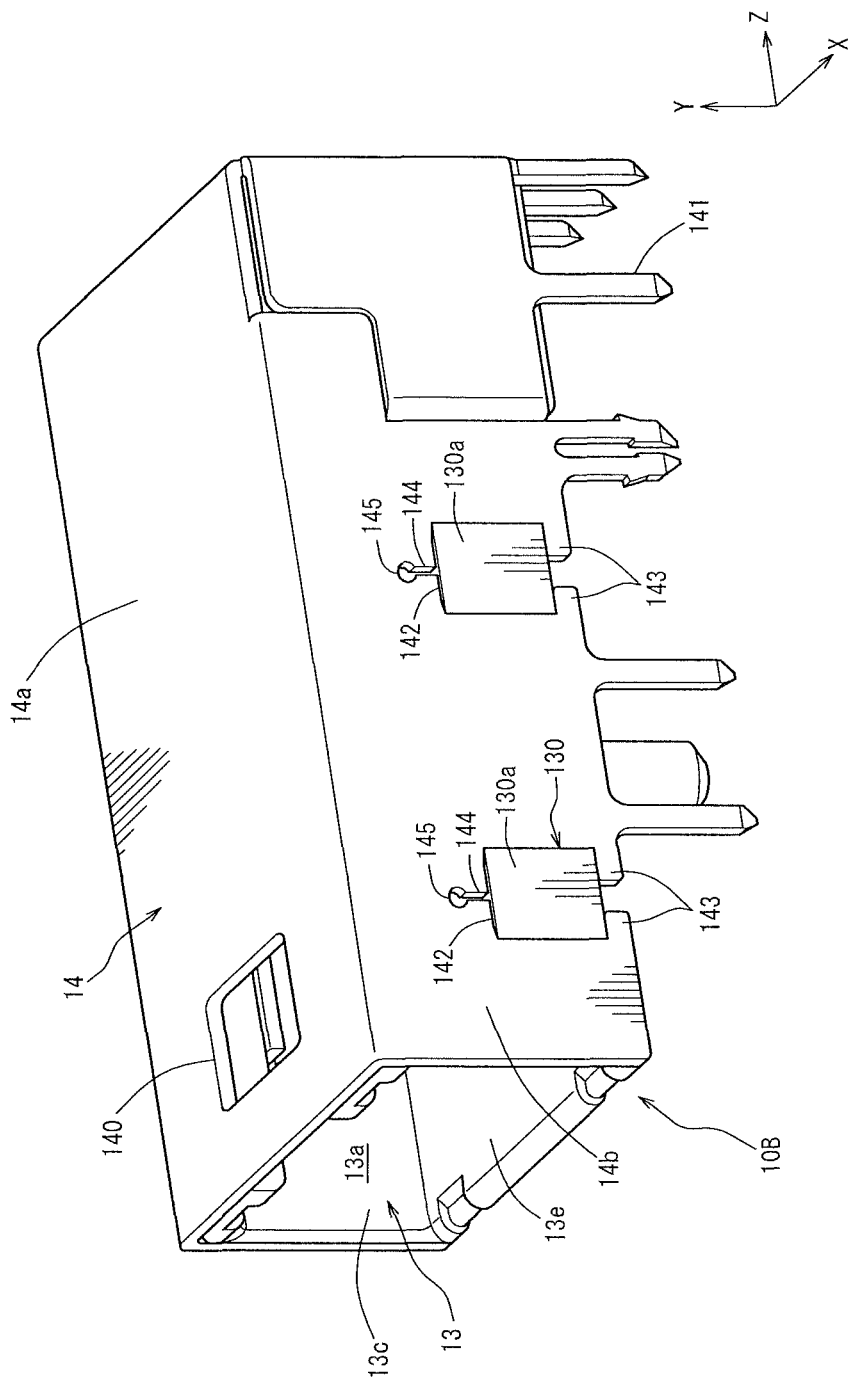
FIG. 9 is an isometric view of the female connector engaged with the metal case.

FIG. 7 shows steps of fixing a metal case 14 to the female connector housing 13. FIG. 8 is a cross-sectional view showing a state where an engageable concaved part 142 of the metal case 14 and an engageable convexed part 130 of the female connector housing 13 are in engagement with each other. FIG. 9 is an isometric view of the female connector 10B engaged with the metal case 14.

Figure 10:
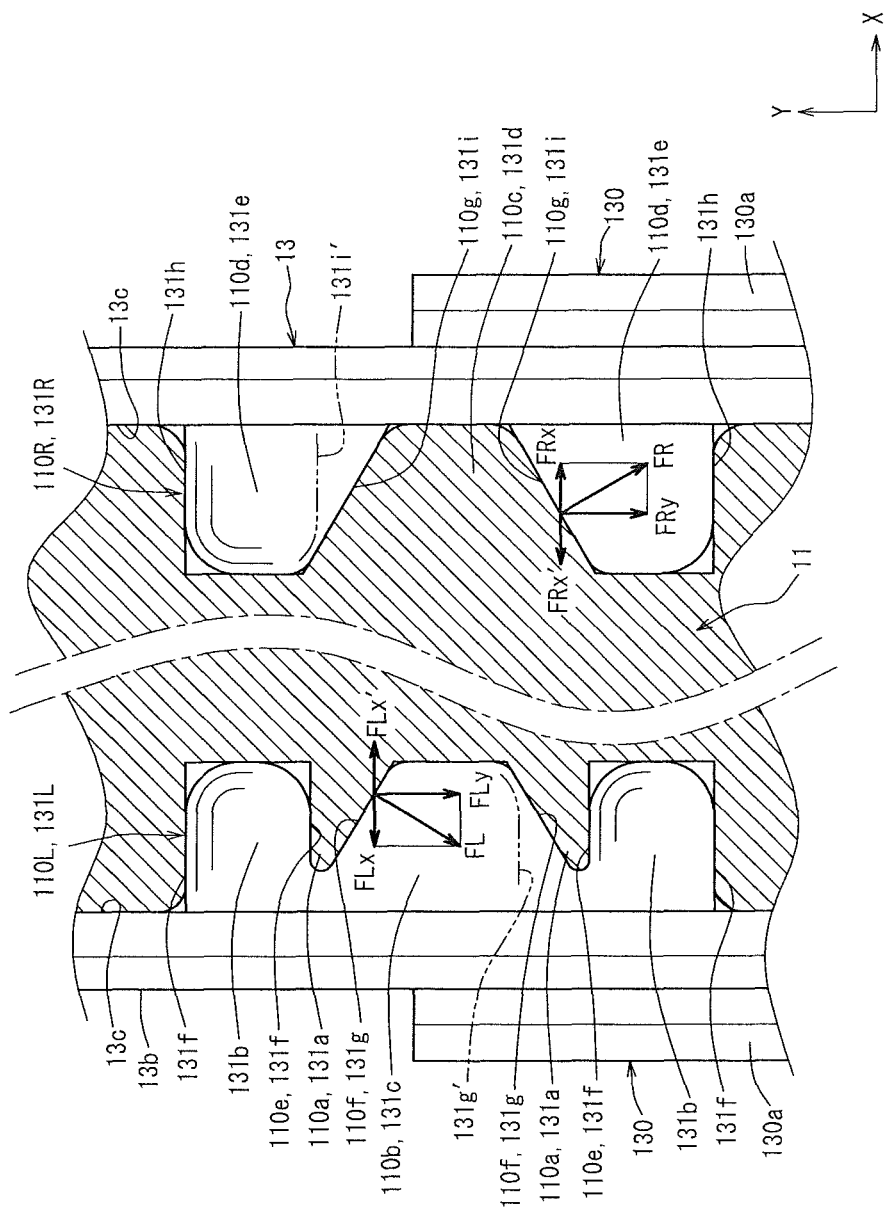
FIG. 10 is a cross-sectional view showing a state where guided convexed and concaved parts of the male connector housing and guiding convexed and concaved parts of the female connector housing are in engagement with each other.
Figure 11:
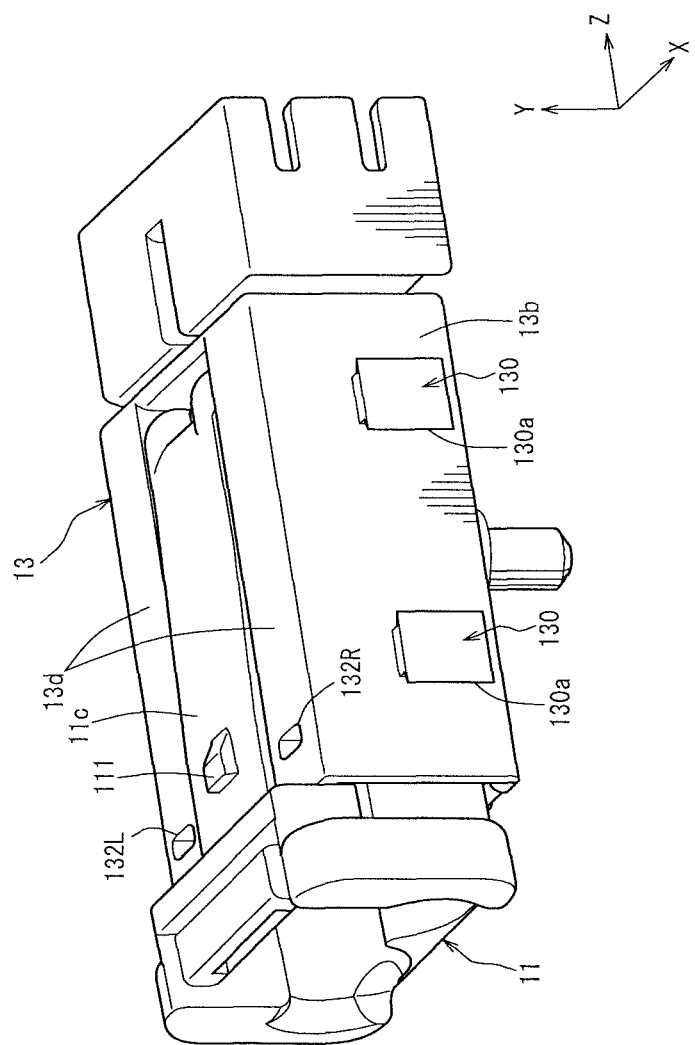
FIG. 11 is an isometric view showing the male connector and the female connector which are connected to each other.

FIG. 10 is a cross-sectional view showing a state where guided convexed and concaved parts 110L and 110R of the male connector housing 11 and guiding convexed and concaved parts 131L and 131R of the female connector housing 13 are in engagement with each other. FIG. 11 is an isometric view showing the male connector 10A and the female connector 10B which are connected to each other.

As shown in FIG. 1, an optical connector 1 includes a male part and a female part engageable with each other. In more detail, the optical connector 1 includes the male connector 10A and the female connector 10B. The male connector 10A is inserted into, and engaged with, the female connector 10B.

As shown in FIG. 1, the terminal-attached optical fiber cable 2 connectable to the optical connector 1 includes optical fiber cables 20 and optical fiber terminals 21 attached thereto. In more detail, tips of optical fibers are exposed for a prescribed length, and the exposed tips of the optical fibers are inserted into, and fixed to, cylindrical ferrules 22 which are included in the optical fiber terminals 21.

As shown in FIG. 1 through FIG. 3, among the male and female optical connectors 10, the male connector 10A includes the resin male connector housing 11 (hereinafter, referred to simply as the "housing 11") having two insertion holes 11a (see FIG. 3) which allow the optical fiber terminals 21 (terminal-attached optical fiber cable 2) to be inserted thereinto, and a terminal fixing member 12 for fixing the optical fiber terminals 21 to the housing 11.

The insertion holes 11a extend in a longitudinal direction and are parallel to each other in order to allow the optical fiber cable 2 with two terminals (optical fiber terminals 21) to be inserted thereinto. The ferrules 22 of the optical fiber terminals 21 are inserted into the insertion holes 11a. Then, the terminal fixing member 12 is inserted into a slit (not shown) of the housing 11. Thus, the optical fiber terminals 21 inserted into the insertion holes 11a are fixed by the terminal fixing member 12. In this manner, the terminal-attached optical fiber cable 2 is assembled to the male connector 10A (housing 11).

The housing 11 includes outer side surfaces 11b facing each other, and the guided convexed and concaved parts 110L and 110R extending in a direction in which the housing 11 is inserted into the female connector 10B. The guided convexed and concaved parts 110L and 110R are provided on the outer side surfaces 11b. In the figures, the direction in which the housing 11 is inserted into the female connector 10B is defined as a Z direction. The planar direction of the outer side surfaces 11b, namely, the direction in which convexed parts 110a and 110c and concaved parts 110b and 110d (described later) included in the guided convexed and concaved parts 110L and 110R are located in parallel is defined as a Y direction. A direction perpendicular to the outer side surfaces 11b, namely, a direction perpendicular to the Y direction, is defined as an X direction. In the figures showing the female connector 10B, the X, Y and Z directions are shown based on the orientation of the male connector 10A when the male connector 10A is inserted into the female connector 10B.

In the housing 11, the two guided convexed and concaved parts 110L and 110R facing each other have asymmetric shapes. The guided convexed and concaved part 110L includes two convexed parts 110a and one concaved part 110b, whereas the guided convexed and concaved part 110R includes one convexed part 110c and two concaved parts 110d.

The convexed parts 110a of the guided convexed and concaved part 110L each have two surfaces. One surface is a horizontal surface 110e extending straight in the X direction, and the other surface is an inclining surface 110f inclining with respect to the X direction.

The convexed part 110c of the guided convexed and concaved part 110R has two surfaces, which are both inclining surfaces 110g inclining with respect to the X direction.

In the guided convexed and concaved part 110L, the inclining directions of the inclining surfaces 110f are set such that the convexed parts 110a have a width decreasing as being laterally outward in the X direction from the corresponding outer side surface 11b. In the guided convexed and concaved part 110R, the inclining directions of the inclining surfaces 110g are set such that the convexed part 110c has a width decreasing as being laterally outward in the X direction from the corresponding outer side surface 11b. In accordance with the set inclining directions, the concaved parts 110b and 110d have a width increasing as being laterally outward in the X direction from the corresponding side surfaces 11b.

A top surface 11c for connecting the outer side surfaces 11b has a plurality of engageable claws 111, 112L and 112R. The engageable claw 111 is located at a central position of the top surface 11c in the X direction. The engageable claw 112L and 112R are located symmetrically while having the engageable claw 111 at the center therebetween.

A bottom surface 11d facing the top surface 11c has engageable claws 113L and 113R at positions corresponding to the engageable claws 112L and 112R.

As shown in FIG. 1 and FIG. 4 through FIG. 6, the female connector 10B includes the resin female connector housing 13 (hereinafter, referred to simply as the "housing 13") for allowing the male connector 10A to be inserted thereinto, and the metal case 14 for covering the housing 13. The female connector 10B also includes two FOTs 3 (see FIG. 1) mounted on a control board (not shown), lenses 4 (see FIG. 1) respectively provided for the FOTs 3, and a spacer 5 (see FIG. 5) for restricting the position of the FOTs 3 with respect to the housing 13 from a rear side. In the female connector 10B, the FOTs 3 are held by the housing 13. The FOTs 3 are known electronic components formed of an appropriate combination of light emitting and receiving elements. The FOTs 3 and the terminal-attached optical fiber cable 2 are both optical transmission path-related members.

As shown in FIG. 4 through FIG. 6, the housing 13 has an insertion space 13a for allowing the housing 11 to be inserted thereinto, and side surfaces 13b outer to the insertion space 13a. Two engageable convexed parts 130 protruding laterally outward in the X direction are provided on each side surface 13b. The housing 13 also has inner side surfaces 13c, which are side walls of the insertion space 13a. As shown in FIG. 4 and FIG. 6, the guiding convexed and concaved parts 131L and 131R are respectively provided on the inner side surfaces 13c. The guiding convexed and concaved parts 131L and 131R extend in the Z direction and are engageable with the guided convexed and concaved parts 110L and 110R, respectively.

Top surfaces 13d for connecting the side surfaces 13b and the inner side surfaces 13c respectively have engageable holes 132L and 132R. A bottom surface 13e for connecting the side surfaces 13b and the inner side surfaces 13c has engageable holes 133L and 133R. The engageable holes 132L, 132R, 133L and 133R respectively correspond to the engageable claws 112L, 112R, 113L and 113R (see FIG. 2 and FIG. 3) of the housing 11.

As shown especially in FIG. 4 and FIG. 5, the engageable convexed parts 130 of the housing 13 each have separation restriction parts 130a. Each separation restriction part 130a is tapered as seen in a plan view and becomes wider in the Z direction or the opposite direction as being distanced from the corresponding side surface 13b.

As shown in FIG. 4, the metal case 14 which is included in the female connector 10B together with the housing 13 is a metal shield case which includes a top plate 14a corresponding to the top surface 13c of the housing 13 and side plates 14b corresponding to the side surfaces 13b, and has a gate-like cross-section. The metal case 14 covers the housing 13 to protect (shield) the FOTs 3 against an influence of electric noise. In addition, the metal case 14 is fixed to, and integrated with, the housing 13 to reinforce the housing 13. Thus, the strength of the entire female connector 10B is increased.

The metal case 14 has an engageable hole 140 corresponding to the engageable claw 111 provided in the top surface 11c (see FIG. 2 and FIG. 3) of the housing 11. The side plates 14b of the metal case 14 respectively have engageable convexed parts 141 and engageable concaved parts 142 at free ends thereof. The engageable convexed parts 141 are insertable into engageable holes formed in the control board, and thus the metal case 14 is engaged and fixed. The engageable concaved parts 142 are concaved toward the top plate 14a.

The side plates 14b each have two engageable concaved parts 142 in correspondence with the engageable convexed parts 130 of the housing 13. Each engageable concaved part 142 has a pair of engagement restriction parts 143 at an edge thereof on the free end of the side plate 14b. Each engageable concaved part 142 has a cut-out part 144, extending toward the top plate 14a, at an edge thereof on the top plate 14a side. At an end of the cut-out part 144, a circular opening 145 having a diameter larger than a width of the cut-out part 144 is provided.

In this embodiment, the metal case 14 is fixed to the housing 13 as follows. First, as represented by the two-dot chain line in FIG. 7, the engageable concaved parts 142 are each expanded as being centered around the circular opening 145 in the plane of the side plate 14b so as to separate the pair of engagement restriction parts 143 from each other. While the engageable concaved parts 142 are held in this expanded state, the engageable convexed parts 130 of the housing 13 are inserted into the engageable concaved parts 142. In this manner, the metal case 14 and the housing 13 are put into engagement with each other.

When the engageable convexed parts 130 are inserted into the engageable concaved parts 142, a reaction force for returning the engageable concaved parts 142 into the original shape is generated to the metal case 14. In this embodiment, edges of the engageable concaved parts 142 are guided along the tapered separation restriction parts 130a. Therefore, as represented by the two-dot chain line in FIG. 8, even if the side plates 14b are slightly shifted laterally outward, the edges of the engageable concaved parts 142 are located at prescribed positions with respect to the engageable convexed parts 130 by the function of the reaction force. Owing to this positioning, the engageable concaved parts 142 and the engageable convexed parts 130 are put into engagement with each other in a prescribed positional relationship.

In this manner, the engageable concaved parts 142 and the engageable convexed parts 130 are put into engagement with each other. Owing to this, as shown in FIG. 8 and FIG. 9, the metal case 14 can be fixed to the housing 13 while the side plates 14b are restricted by the separation restriction parts 130a from being moved outward, namely, from being distanced from the side surfaces 13b.

As shown in FIG. 9, in the state where the metal case 14 is fixed to the housing 13, the housing 13 is covered with the metal case 14. The engagement restriction parts 143 are engaged with free-end-side edges of the engageable convexed parts 130 of the side surfaces 13b, namely, the edges of the engageable convexed parts 130 on the side on which the engageable convexed parts 130 could be drawn out from the engageable concaved parts 142. Thus, the engageable convexed parts 130 are restricted from being drawn out.

As shown in FIG. 6, in the housing 13, the two guiding convexed and concaved parts 131L and 131R facing each other have asymmetric shapes. The guiding convexed and concaved part 131L includes two concaved parts 131a, two convexed parts 131b and one convexed part 131c, whereas the guiding convexed and concaved part 131R includes one concaved part 131d and two convexed parts 131e.

The convexed parts 131b, having the convexed part 131c therebetween, of the guided convexed and concaved part 110L each have two surfaces, which are horizontal surfaces 131f extending straight in the X direction. Thus, the convexed parts 131b are generally rectangular. The convexed part 131c held between the convexed parts 131b have two surfaces, which are inclining surfaces 131g inclining with respect to the X direction.

The convexed parts 131e of the guiding convexed and concaved part 131R each have two surfaces. One surface is a horizontal surface 131h extending straight in the X direction, and the other surface is an inclining surface 131i inclining with respect to the X direction.

In the guiding convexed and concaved part 131L, the inclining directions of the inclining surfaces 131g are set such that the convexed part 131c has a width decreasing as being laterally inward in the X direction from the corresponding inner side surface 13c. In the guiding convexed and concaved part 131R, the inclining directions of the inclining surfaces 131i are set such that the convexed parts 131e each have a width decreasing as being laterally inward in the X direction from the corresponding inner side surface 13c. In accordance with the set inclining directions, the concaved parts 131a and 131d have a width increasing as being laterally inward in the X direction from the corresponding inner side surfaces 13c.

In this embodiment, the housing 11 (male connector 10A) is inserted into the housing 13 (female connector 10B) as follows. First, as shown in FIG. 10, the guided convexed and concaved parts 110L and 110R are put into engagement with the guiding convexed and concaved parts 131L and 131R respectively. In this engagement state, the housing 11 is pushed in the Z direction along the guiding convexed and concaved parts 131L and 131R. As described above, the housing 11 can be guided in the Z direction by putting the guided convexed and concaved parts 110L and 110R into engagement with the guiding convexed and concaved parts 131L and 131R respectively. Owing to the guidance in the Z direction, the housing 11 can be inserted into a prescribed position in the insertion space 13a.

In this manner, the housing 11 of the male connector 10A is inserted into the housing 13 of the female connector 10B. As a result, as shown in FIG. 11, the male connector 10A can be connected to the female connector 10B. Such connection of the male connector 10A and the female connector 10B allows the terminal-attached optical fiber cable 2 (optical fiber terminals 21) assembled to the housing 11 to be connected to the FOTs 3. In FIG. 11, the metal case 14 is omitted for the sake of convenience.

In the state where the male connector 10A and the female connector 10B are connected to each other, the engageable claws 112L, 112R, 113L and 113R of the housing 11 are engaged with the corresponding engageable holes 132L, 132R, 133L and 133R of the housing 13 respectively, and the engageable claw 111 is engaged with the engageable hole 140 of the metal case 14. In addition, as shown in FIG. 10, the position of the housing 11 in the planar directions perpendicular to the Z direction (X direction and Y direction) is restricted by the guided convexed and concaved parts 110L and 110R and the guiding convexed and concaved parts 131L and 131R.

In this state, in the guided convexed and concaved parts 110L and 110R and the guiding convexed and concaved parts 131L and 131R, the inclining surfaces 131g and 131i of the convexed parts 131c and 131e face, and are in plane contact with, the inclining surfaces 110f and 110g of the convexed parts 110a and 110c.

In this embodiment, as described above, the female connector 10B of the optical connector 1 has the engageable concaved parts 142 at the free ends of the side plates 14b of the metal case 14. Owing to this, the engageable convexed parts 130 can be put into engagement with the engageable concaved parts 142 with no need to push outward the free ends of the side plates 14b. In this case, the metal case 14 can be fixed to the housing 13 with no need to push outward the free ends. Therefore, the metal case 14 is prevented from being plastically deformed, and as a result, is suppressed from being shaky after being fixed to the housing 13.

The separation restriction parts 130a are provided for restricting the side plates 14b from being moved laterally outward, namely, from being distanced from the side surfaces 13b in the state where the engageable convexed parts 130 and the engageable concaved parts 142 are in engagement with each other. Owing to this, the side plates 14b are suppressed with certainty from being shaky. As a result, the entire metal case 14 is suppressed with certainty from being shaky.

By suppressing the metal case 14 from being shaky in this manner, the housing 13 and the metal case 14 can be integrated together more strongly. This improves the strength of the female connector 10B and thus stabilizes the connection state of the terminal-attached optical fiber cable 2 and the FOTs 3. In addition, high quality transmission characteristics can be maintained for a long time.

The separation restriction parts 130a are tapered to become wider as being farther from the side surfaces 13b. Therefore, even if the side plates 14b are slightly shifted laterally outward when the engageable convexed parts 130 are inserted into the engageable concaved parts 142, the edges of the engageable concaved parts 142 can be guided along the tapered separation restriction parts 130a to be smoothly located at prescribed positions with respect to the engageable convexed parts 130. This certainly prevents the situation that when the engageable convexed parts 130 are inserted into the engageable concaved parts 142, a load in an unexpected direction is applied to the engageable convexed parts 130 and the edges of the engageable concaved parts 142 to deform the engageable convexed parts 130 and the engageable concaved parts 142.

The engagement restriction parts 143 are provided which are engageable with the free-end-side edges of the engageable convexed parts 130 to restrict the engageable convexed parts 130 from being drawn out. Owing to this, the engageable convexed parts 130 are prevented with certainty from being drawn out from the engageable concaved parts 142. This can integrate the housing 13 and the metal case 14 together more strongly.

The cut-out parts 144 extending from the engageable concaved parts 142 toward the top plate 14a are provided. Owing to this, the engageable concaved parts 142 can be expanded easily in the planes of the side plates 14b. Therefore, even though the engagement restriction parts 143 are provided, the engageable convexed parts 130 can be put into engagement with the engageable concaved parts 142 easily by expanding the engageable concaved parts 142.

When the engageable concaved parts 142 are expanded in the planes of the side plates 14b, a reaction force for returning the engageable concaved parts 142 (metal case 14) into the original shape is generated. Therefore, as compared with the case where the free ends of the side plates 14b are pushed outward, the metal case 14 is suppressed more from being plastically deformed.

At an end of each cut-out part 144, the circular opening 145 having a diameter larger than a width of the cut-out part 144 is formed. Owing to this, stress concentration on the ends of the cut-out parts 144 is prevented when the engageable concaved parts 142 are expanded.

In this embodiment, the guiding convexed and concaved parts 131L and 131R are provided which are engageable with the guided convexed and concaved parts 110L and 110R to guide the housing 11 in the Z direction. Owing to this, the workability of connecting the housings 11 and 13, namely, the workability of assembling the optical connector 1 can be improved.

The guiding convexed and concaved parts 131L and 131R have the inclining surfaces 131g and 131i, whereas the guided convexed and concaved parts 110L and 110R have the inclining surfaces 110f and 110g facing the inclining surfaces 131g and 131i. Owing to this, as compared with the case where horizontal surfaces 131g' and 131i' are provided as represented by the two-dot chain line in FIG. 10, the contact parts (herein, contact surface area size) of the inclining surfaces 131g and 131i and the inclining surfaces 110f and 110g can be increased. In this case, certain contact parts (certain contact surface area size) can be provided without fail even if the length of the convexed parts 131c and 131e in the X direction is not made long. Therefore, the supporting rigidity of the housing 11 can be provided with certainty while the optical connector 1 is prevented from being increased in size.

Since the supporting rigidity of the housing 11 is provided with certainty in this manner, the engagement state of the male and female housings 11 and 13 is stabilized. This improves the engagement positional precision of the male and female housings 11 and 13, and thus improves the positional precision of the terminal-attached optical fiber cable 2 and the FOTs 3. Therefore, high quality transmission characteristics can be maintained for a long time.

The inclining directions of the inclining surfaces 131g and 131i are set such that the convexed parts 131c and 131e included in the guiding convexed and concaved parts 131L and 131R each have a width decreasing as being laterally inward from the corresponding inner side surface 13c. Owing to this, base parts of the convexed parts 131c and 131e (ends on the inner side surface 13c side) can be made thickest. In this case, even if, for example, large loads are applied to the convexed parts 131c and 131e when the housing 11 is inserted, the convexed parts 131c and 131e are prevented from being deformed owing to the thick base parts thereof.

As shown in FIG. 10, when loads FL and FR are applied to the inclining surfaces 131g and 131i of the convexed parts 131c and 131e, force components FLx, FLy, FRx and FRy in the X and Y directions are generated. However, in this embodiment, the force components FLx and FRx in the X direction can be received by the inner side surfaces 13c. Owing to this, even if, for example, large loads are applied to the inclining surfaces 131g and 131i when the housing 11 is inserted, the convexed parts 131c and 131e are suppressed more from being deformed as compared with the case where large loads are applied to the horizontal surfaces 131g' and 131i'.

The inclining directions of the inclining surfaces 110f and 110g are set such that the convexed parts 110a and 110c included in the guided convexed and concaved parts 110L and 110R each have a width decreasing as being laterally outward from the corresponding outer side surface 11b. Owing to this, base parts of the convexed parts 110a and 110c (ends on the outer side surface 11b side) can be made thickest. In this case, even if, for example, large loads are applied to the convexed parts 110a and 110c when the housing 11 is inserted, the convexed parts 110a and 110c are prevented from being deformed owing to the thick base parts thereof.

In addition, when loads are applied to the inclining surfaces 110f and 110g of the convexed parts 110a and 110c, force components in the X direction can be received by the outer side surfaces 11b (see FIG. 3) like in the case of the convexed parts 131c and 131e. Owing to this, even if, for example, large loads are applied to the inclining surfaces 110f and 110g when the housing 11 is inserted, the convexed parts 110a and 110c are prevented more from being deformed as compared with the case where large loads are applied to the horizontal surfaces.

In the housing 13, the guiding convexed and concaved parts 131L and 131R of the inner side surfaces 13c facing each other are asymmetric. In the housing 11, the guided convexed and concaved parts 110L and 110R of the outer side surfaces 11b facing each other are asymmetric. Owing to this, an appropriate orientation of the housing 11 when the housing 11 is to be inserted into the housing 13 can be easily determined based on the shapes of the guided convexed and concaved parts 110L and 110R and the guiding convexed and concaved parts 131L and 131R. Thus, erroneous insertion of the housing 11 is prevented.

In this embodiment, the guiding convexed and concaved parts 131L and 131R are provided on the inner side surfaces 13c, and the guided convexed and concaved parts 110L and 110R are provided on the outer side surfaces 11b. As a result, as shown in FIG. 10, reaction forces FLx' and FRx' acting inward in the X direction, namely, acting in opposite directions to each other, are generated in the guided convexed and concaved parts 110L and 110R. Owing to this, the position of the housing 11 (male connector 10A) in the X direction can be restricted with certainty.

In the above-described embodiment, each tapered separation restriction part 130a has a cross-section which is tapered along a straight line. The present invention is not limited to this. For example, each tapered separation restriction part may have a cross-section which is tapered along a line bent at two or more points like a portion of a polygonal shape or, may have a cross-section which is tapered along an arcked line.

Figure 12A:
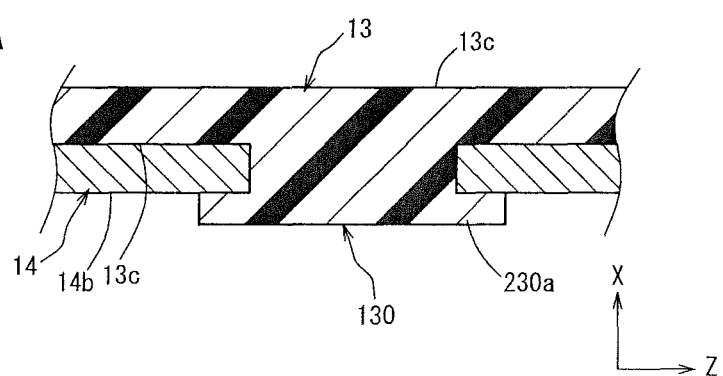
FIGS. 12A and 12B are each a cross-sectional view showing a state where an engageable concaved part of a metal case and an engageable convexed part of a female connector housing are in engagement with each other in another embodiment.
Figure 12B:
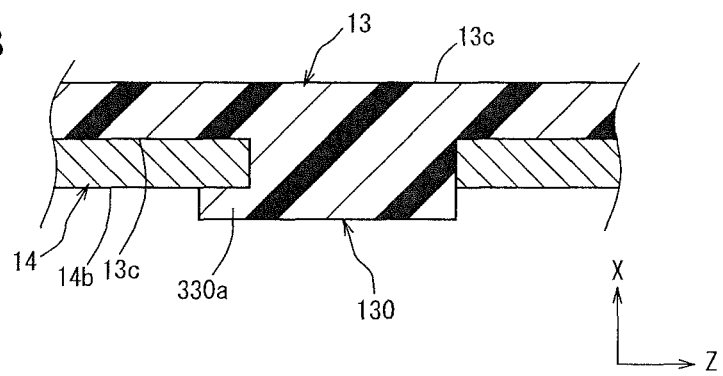

According to the present invention, the separation restriction parts are not limited to being tapered. For example, as shown in FIG. 12A, separation restriction parts 230 having a rectangular cross-section may be provided. Such a separation restriction part having a rectangular cross-section may be a separation restriction part 330a provided at one side of the engageable convexed part 130 as shown in FIG. 12B. In FIGS. 12A and 12B, elements identical to those in the above-described first embodiment bear identical reference signs thereto. Such elements will not be described.

Figure 13:
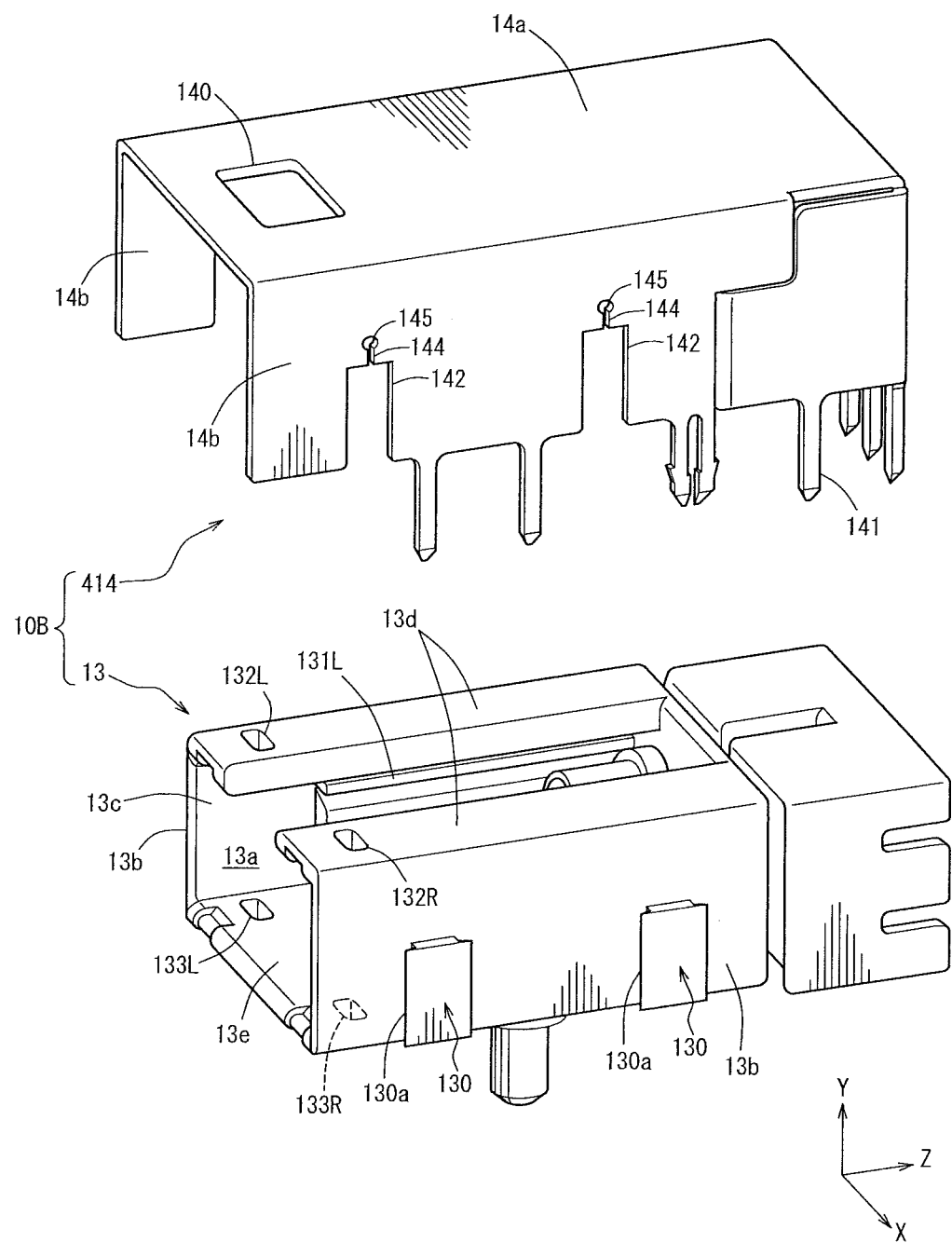
FIG. 13 is an exploded isometric view of a female connector in still another embodiment.

According to the present invention, in the case where the coefficient of friction between the engageable convexed parts 130 and the engageable concaved parts 142 is large when the parts 130 and 142 are engaged with each other, it is not necessary to provide the engagement restriction parts 143 (see FIG. 4 and FIG. 7). FIG. 13 shows a metal case 414 with no engagement restriction part 143. In FIG. 13, elements identical to those in the first embodiment bear identical reference signs thereto. Such elements will not be described.

Figure 14:
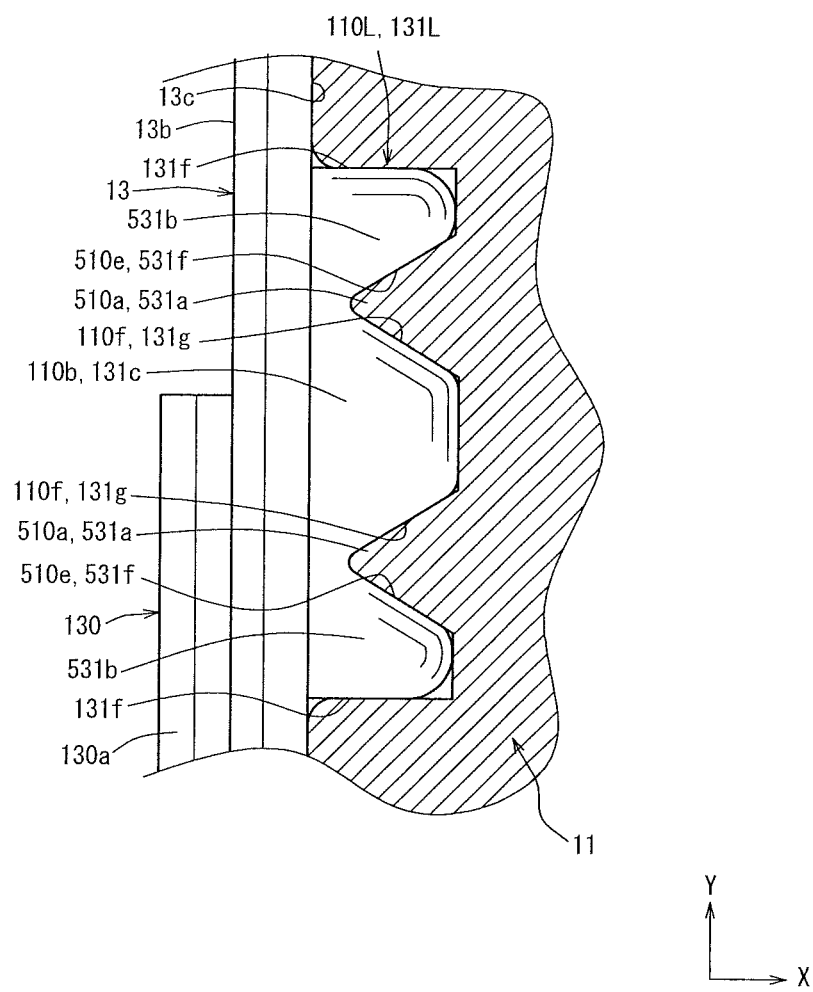
FIG. 14 is a cross-sectional view showing a state where engageable concaved parts of a metal case and engageable convexed parts of a female connector housing are in engagement with each other in still another embodiment.

In the first embodiment, the generally rectangular convexed parts 131b are provided. Alternatively, as shown in FIG. 14, convexed parts 531b each having an inclining surface 531f on one of the surfaces thereof may be provided. In this case, as shown in FIG. 14, both surfaces of concaved parts 531a are inclined, and two surfaces of each of corresponding convexed parts 510a are inclining surfaces 110f and 510e. In FIG. 14, elements identical to those in the first embodiment bear identical reference signs thereto. Such elements will not be described.

Figure 15:
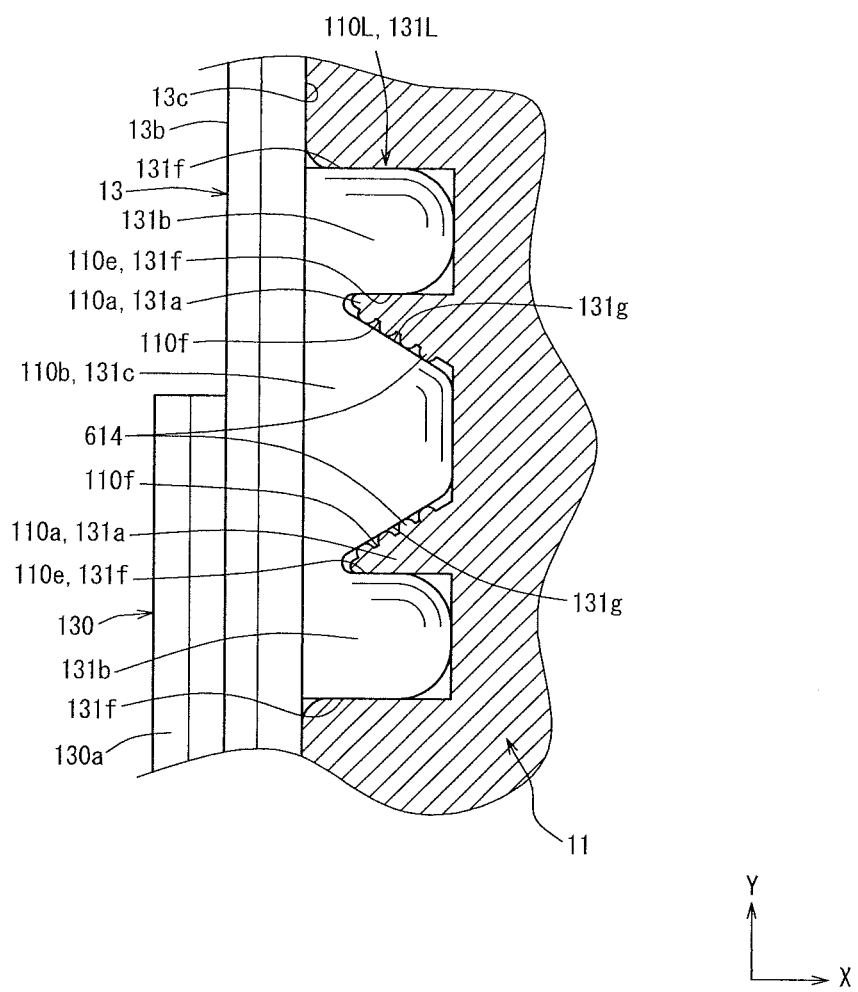
FIG. 15 is a cross-sectional view showing a state where engageable concaved parts of a metal case and engageable convexed parts of a female connector housing are in engagement with each other in still another embodiment.

The inclining surfaces and the inclining surfaces facing thereto are not limited to being in plane contact with each other. For example, as shown in FIG. 15, either one of the inclining surfaces 131g and the inclining surfaces 110f (in FIG. 15, the inclining surfaces 110f) facing thereto may have a plurality of contact parts 614 provided thereon, so that the inclining surfaces 131g and the inclining surfaces 110f facing thereto are in linear contact or point contact with each other. In FIG. 15, elements identical to those in the first embodiment bear identical reference signs thereto. Such elements will not be described.

In the above-described embodiment, the terminal-attached optical fiber cable 2 is connected to the FOTs 3 via the optical connector 1. The present invention is not limited to this. For example, the present invention is applicable to a terminal-attached optical fiber cable to which a male connector is assembled, and a terminal-attached optical fiber cable to which a female connector is assembled, which are connected to each other (so-called wire-to-wire connection).

The optical transmission path-related members according to the present invention correspond to the terminal-attached fiber cable 2 and the FOTs 3 in the embodiments;

the inclining surface corresponds to the inclining surfaces 131g, 131i and 531f; and the counter inclining surface corresponds to the inclining surfaces 110f, 110g and 510e.

However, the present invention is not limited to the above-described embodiments.

REFERENCE SIGNS LIST

1 . . . Optical connector
2 . . . Terminal-attached fiber cable
3 . . . FOT
10A . . . Male connector
10B . . . Female connector
11 . . . Male connector housing
13 . . . Female connector housing
110L, 110R . . . Guided convexed and concaved part
110f, 110g, 510e . . . Inclining surface
131L, 131R . . . Guiding convexed and concaved part
131g, 131i, 531f . . . Inclining surface

The invention claimed is:

1. An optical connector, comprising:
   a male connector housing to which optical transmission path-related members forming an optical transmission path are assembled; and
   a female connector housing for allowing the male connector housing to be inserted thereinto;
   wherein:
   at least one of outer side surfaces of the male connector housing has a guided convexed and concaved part extending in a direction in which the male connector housing is inserted;
   an inner side surface of the female connector housing, corresponding to the at least one of outer side surfaces in a state where the male connector housing is inserted into the female connector housing, has a guiding convexed and concaved part extending in the direction in which the male connector housing is inserted, the guiding convexed and concaved part being engageable with the guided convexed and concaved part to guide the male connector housing in the direction in which the male connector housing is inserted;
   the guiding convexed and concaved part has an inclining surface inclining with respect to a direction perpendicular to the inner side surface; and
   the guided convexed and concaved part has a counter inclining surface facing the inclining surface.

2. An optical connector according to claim 1, wherein:
   an inclining direction of the inclining surface is set such that a convexed part included in the guiding convexed and concaved part has a width decreasing as being laterally inward from the inner side surface of the female connector housing; and
   an inclining direction of the counter inclining surface is set such that a convexed part included in the guided convexed and concaved part has a width decreasing as being laterally outward from the at least one of outer side surfaces of the male connector housing.

3. An optical connector according to claim 2, wherein:
   the female connector housing has the guiding convexed and concaved part on each of both inner side surfaces thereof facing each other;
   the male connector housing has the guided convexed and concaved part on each of both outer side surfaces thereof facing each other;
   the guiding convexed and concaved parts are asymmetric; and
   the guided convexed and concaved parts are asymmetric.

4. An optical connector according to claim 1, wherein:
   the female connector housing has the guiding convexed and concaved part on each of both inner side surfaces thereof facing each other;
   the male connector housing has the guided convexed and concaved part on each of both outer side surfaces thereof facing each other;
   the guiding convexed and concaved parts are asymmetric; and
   the guided convexed and concaved parts are asymmetric.

5. A male connector housing, for an optical connector, to which optical transmission path-related members forming an optical transmission path are assembled, and which is allowed to be inserted into a female connector housing; the male connector housing comprising:
   a guided convexed and concaved part which is engageable with a guiding convexed and concaved part provided on at least one of inner side inner surfaces of the female connector housing and extends in a direction in which the male connector housing is inserted into the female connector housing, the guided convexed and concaved part being provided an outer side surface corresponding to the at least one of inner side surfaces in a state where the male connector housing is inserted into the female connector housing;
   wherein the guided convexed and concaved part has a counter inclining surface facing an inclining surface of the guiding convexed and concaved part, the inclining surface inclining with respect to a direction perpendicular to the at least one of inner side surface of the female connector housing.

6. A male connector housing for an optical connector according to claim 5, wherein:
   an inclining direction of the counter inclining surface is set such that a convexed part included in the guided convexed and concaved part has a width decreasing as being laterally outward from the outer side surface.

7. A male connector housing for an optical connector according to claim 6, wherein both of outer side surfaces of the male connector housing facing each other each have the guided convexed and concaved part, and the guided convexed and concaved parts are asymmetric.

8. A male connector housing for an optical connector according to claim 5, wherein both of outer side surfaces of the male connector housing facing each other each have the guided convexed and concaved part, and the guided convexed and concaved parts are asymmetric.

9. A female connector housing for an optical connector, the female connector housing allowing a male connector housing, to which optical transmission path-related members forming an optical transmission path are assembled, to be inserted thereinto; the female connector housing comprising:
   a guiding convexed and concaved part which is engageable with a guided convexed and concaved part provided on at least one of outer side inner surfaces of the male connector housing and extends in a direction in which the male connector housing is inserted into the female connector housing, the guiding convexed and concaved part being provided on an inner side surface corresponding to the at least one of outer side surfaces of the male connector housing in a state where the male connector housing is inserted into the female connector housing;
   wherein the guiding convexed and concaved part has an inclining surface facing a counter inclining surface of the guided convexed and concaved part of the male connector housing, the inclining surface inclining with respect to a direction perpendicular to the inner side surface.

10. A female connector housing for an optical connector according to claim 9, wherein:
    an inclining direction of the inclining surface is set such that a convexed part included in the guiding convexed and concaved part has a width decreasing as being laterally inward from the inner side surface.

11. A female connector housing for an optical connector according to claim 10, wherein both of inner side surfaces of the female connector housing facing each other each have the guiding convexed and concaved part, and the guiding convexed and concaved parts are asymmetric.

12. A female connector housing for an optical connector according to claim 9, wherein both of inner side surfaces of the female connector housing facing each other each have the guiding convexed and concaved part, and the guiding convexed and concaved parts are asymmetric.

* * * * *